(12) United States Patent
Inoue et al.

(10) Patent No.: US 8,467,026 B2
(45) Date of Patent: Jun. 18, 2013

(54) LIQUID CRYSTAL DISPLAY DEVICE AND ELECTRONIC APPARATUS

(75) Inventors: Yuichi Inoue, Kanagawa (JP); Ryo Ogawa, Tokyo (JP); Shunichi Suwa, Kanagawa (JP)

(73) Assignee: Sony Corporation, Tokyo (JP)

( * ) Notice: Subject to any disclaimer, the term of this patent is extended or adjusted under 35 U.S.C. 154(b) by 597 days.

(21) Appl. No.: 12/651,030

(22) Filed: Dec. 31, 2009

(65) Prior Publication Data

US 2010/0182521 A1 Jul. 22, 2010

(30) Foreign Application Priority Data

Jan. 20, 2009 (JP) ................. P2009-009524

(51) Int. Cl.
*G02F 1/1343* (2006.01)
(52) U.S. Cl.
USPC .......................................... 349/144
(58) Field of Classification Search
USPC .......................................... 349/144
See application file for complete search history.

(56) References Cited

U.S. PATENT DOCUMENTS

| | | | |
|---|---|---|---|
| 2004/0150775 A1* | 8/2004 | Nakasogi et al. | 349/130 |
| 2005/0100784 A1* | 5/2005 | Yageta et al. | 429/160 |
| 2006/0164585 A1* | 7/2006 | Shih | 349/144 |
| 2007/0146589 A1* | 6/2007 | Ohmuro et al. | 349/113 |
| 2007/0216844 A1* | 9/2007 | Chin et al. | 349/144 |
| 2008/0180607 A1 | 7/2008 | Su et al. | |

FOREIGN PATENT DOCUMENTS

| | | |
|---|---|---|
| JP | 2008-189610 | 8/2008 |
| JP | 2010-033054 | 2/2010 |
| JP | 2010-128211 | 6/2010 |

* cited by examiner

*Primary Examiner* — Timothy L Rude
(74) *Attorney, Agent, or Firm* — Finnegan, Henderson, Farabow, Garrett & Dunner, LLP (57) ABSTRACT

A liquid crystal display device includes: a plurality of pixel electrodes formed of a frame-shaped connection electrode and electrode bodies arranged in parallel to one another in a frame of the connection electrode and supported by and connected to the connection electrode; and a common electrode insulated from the plurality of pixel electrodes.

9 Claims, 9 Drawing Sheets

LIQUID CRYSTAL DISPLAY DEVICE AND ELECTRONIC APPARATUS

BACKGROUND OF THE INVENTION

1. Field of the Invention

The present invention relates to a liquid crystal display device and an electronic apparatus, and particularly to a liquid crystal display device including pixel electrodes, each of which has a plurality of tiny electrode bodies arranged therein, and an electronic apparatus using the liquid crystal display device as a display panel.

2. Description of the Related Art

As an active-matrix liquid crystal display device, a multi-domain vertically aligned mode (MVA mode) has been proposed. The MVA mode improves viewing angle characteristics by providing slits in each pixel electrode to disperse the direction in which liquid crystal molecules are inclined.

Each pixel electrode in a liquid crystal display device driven in the MVA mode is divided into four areas along boundaries, for example, the center line parallel to the horizontal direction and the center line parallel to the vertical direction. In each of the areas, slits extend along four directions from electrode bodies disposed in correspondence with the center lines perpendicular to each other, and the slits communicate with the periphery of the pixel electrode (see JP-A-2006-189610, for example, and particularly see FIGS. 1 and 3 and the corresponding description).

SUMMARY OF THE INVENTION

In the liquid crystal display device driven in the MVA mode described above, however, signal lines, scan lines, power lines, and other bus lines are disposed in such a way that each pixel electrode overlays these bus lines. As a result, the electric field produced by the bus lines leaks through the slits and affects the orientation of the liquid crystal molecules, resulting in light leakage against a black screen or other display problems. When a white rectangle is displayed only at the center of a full black screen, in particular, the black areas above and below the white rectangle become slightly bright. This is called crosstalk and a significant problem.

Thus, it is desirable to provide a liquid crystal display device capable of preventing the orientation of liquid crystal molecules from being disturbed due to the electric field leaking through electrode members that form each pixel electrode and hence capable of preventing light from leaking and providing excellent display characteristics. It is also desirable to provide an electronic apparatus using the liquid crystal display device.

A liquid crystal display device according to an embodiment of the present invention includes a plurality of pixel electrodes and a common electrode insulated from the plurality of pixel electrodes. In particular, each of the pixel electrodes includes a frame-shaped connection electrode and electrode bodies arranged in parallel to one another in a frame of the connection electrode and supported by and connected to the connection electrode.

An electronic apparatus according to another embodiment of the invention includes a liquid crystal panel including the thus configured pixel electrodes and common electrode.

In the thus configured liquid crystal display device, since each of the pixel electrodes is formed of a plurality of electrode bodies arranged in parallel to one another, applying voltages to the pixel electrodes causes liquid crystal molecules having negative dielectric anisotropy to be aligned with and inclined in the direction in which the electrode bodies extend. Each of the pixel electrodes includes a frame-shaped connection electrode for connecting and supporting the plurality of electrode bodies. As a result, disposing the frame-shaped connection electrode in such a way that it overlays the wiring line connected to a thin-film transistor for driving the corresponding pixel electrode allows the connection electrode to shield the wiring line and hence prevents the electric field resulting from the voltage applied to the wiring line from leaking through the slits between the electrode bodies of the pixel electrode.

Since the embodiments of the present invention described above can prevent the electric field from leaking through the slits, a liquid crystal display device having high-contrast display characteristics without liquid crystal molecule orientation disturbance due to the electric field leakage and corresponding light leakage and an electronic apparatus using the liquid crystal display device can be provided.

DESCRIPTION OF THE PREFERRED EMBODIMENTS

Embodiments of the invention will be described below in the following order.

1. First embodiment (an example in which a connection electrode that forms a pixel electrode overlays wiring lines)

2. Second embodiment (an example in which a connection electrode that forms a pixel electrode is shifted from wiring lines)

3. Variations of the embodiments (variations in the shape of the pixel electrode)

1. First Embodiment

[Circuit Configuration of Liquid Crystal Display Device]

Figure 1:
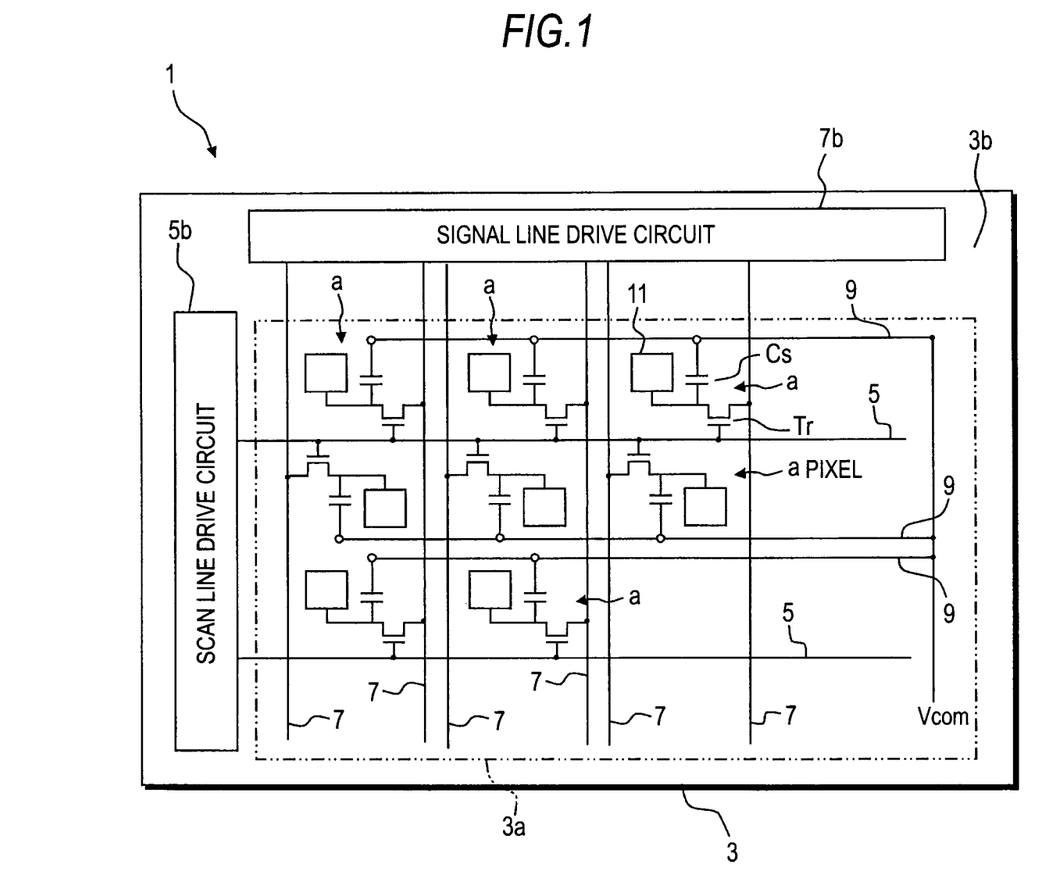
FIG. 1 shows an exemplary circuit configuration of a liquid crystal display device of an embodiment.

FIG. 1 shows an exemplary circuit configuration of a liquid crystal display device 1 of the present embodiment. The circuit configuration of the liquid crystal display device 1 will first be described with reference to FIG. 1.

In the liquid crystal display device 1 shown in FIG. 1, a display area 3a and a peripheral area 3b around the display area 3a are set on a substrate 3. In the display area 3a, a plurality of scan lines 5 are disposed in a first direction (the horizontal direction in the description) and a plurality of signal lines 7 are disposed in a second direction (the vertical direction in the description). Two common wiring lines 9 are further disposed in the display area 3a for each of the scan lines 5 on opposite sides thereof. A pixel a is provided in the portion surrounded by a scan line 5, a common line 9, and two signal lines 7, and the pixels 5 form a pixel array. On the other hand, in the peripheral area 3b are disposed a scan line drive circuit 5b that drives the scan lines 5 and a signal line drive circuit 7b that supplies video signals (that is, input signals) according to brightness information to the signal lines 7.

In each of the pixels (a), a pixel circuit formed of, for example, a thin-film transistor Tr as a switching element and a storage capacitor Cs is provided, and a pixel electrode 11 is connected to the pixel circuit. The pixel electrode 11 is provided on an interlayer insulating film that covers the pixel circuit, as will be described below in detail with reference to a plan view and a cross-sectional view.

In the thin-film transistor Tr, the gate electrode is connected to the corresponding scan line 5, the source electrode is connected to the corresponding signal line 7, and the drain electrode is connected to one of the electrodes of the storage capacitor Cs and the pixel electrode 11. The thin-film transistors Tr in two pixels (a) disposed on opposite sides of a scan line 5 connect their gate electrodes to the shared scan line 5. The other electrode of the capacitive element Cs is connected to the corresponding common wiring line 9. The common wiring line 9 is connected to a common electrode on the side where a counter substrate (not shown in FIG. 1) is present.

In the configuration described above, the voltage of a video signal written from the signal line 7 via the thin-film transistor Tr is supplied to the pixel electrode 11. At the same time, the same voltage is stored in the storage capacitor Cs.

The configuration of the pixel circuit described above is presented only by way of example. A capacitive element may be provided in the pixel circuit as necessary, or a plurality of transistors may form the pixel circuit as necessary. Further, in accordance with any change in the pixel circuit, a drive circuit necessary due to the change may be added to the peripheral area 3b.

[Layout of Liquid Crystal Display Device]

Figure 2:
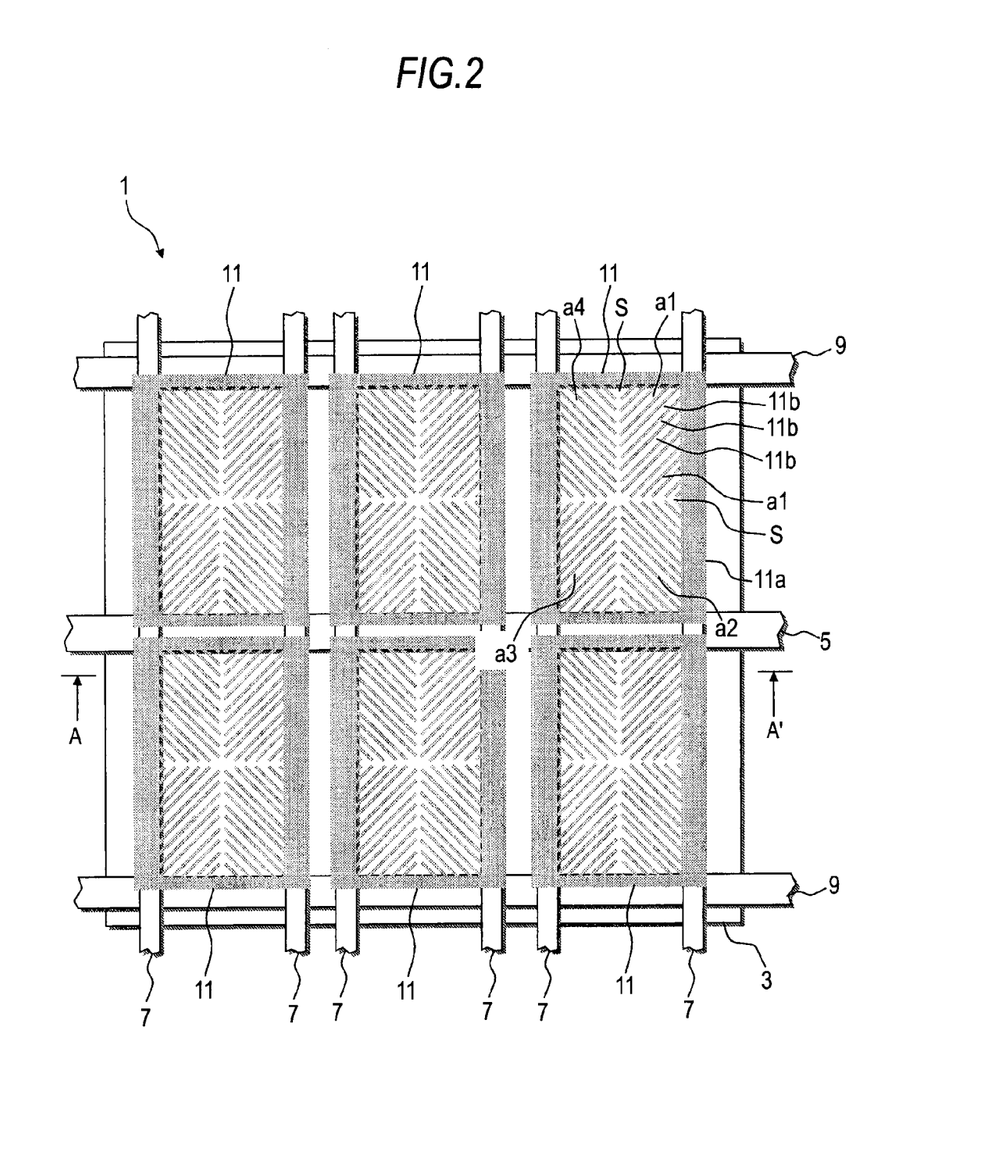
FIG. 2 shows an example of the layout of a liquid crystal display device 1 of a first embodiment.
Figure 3:
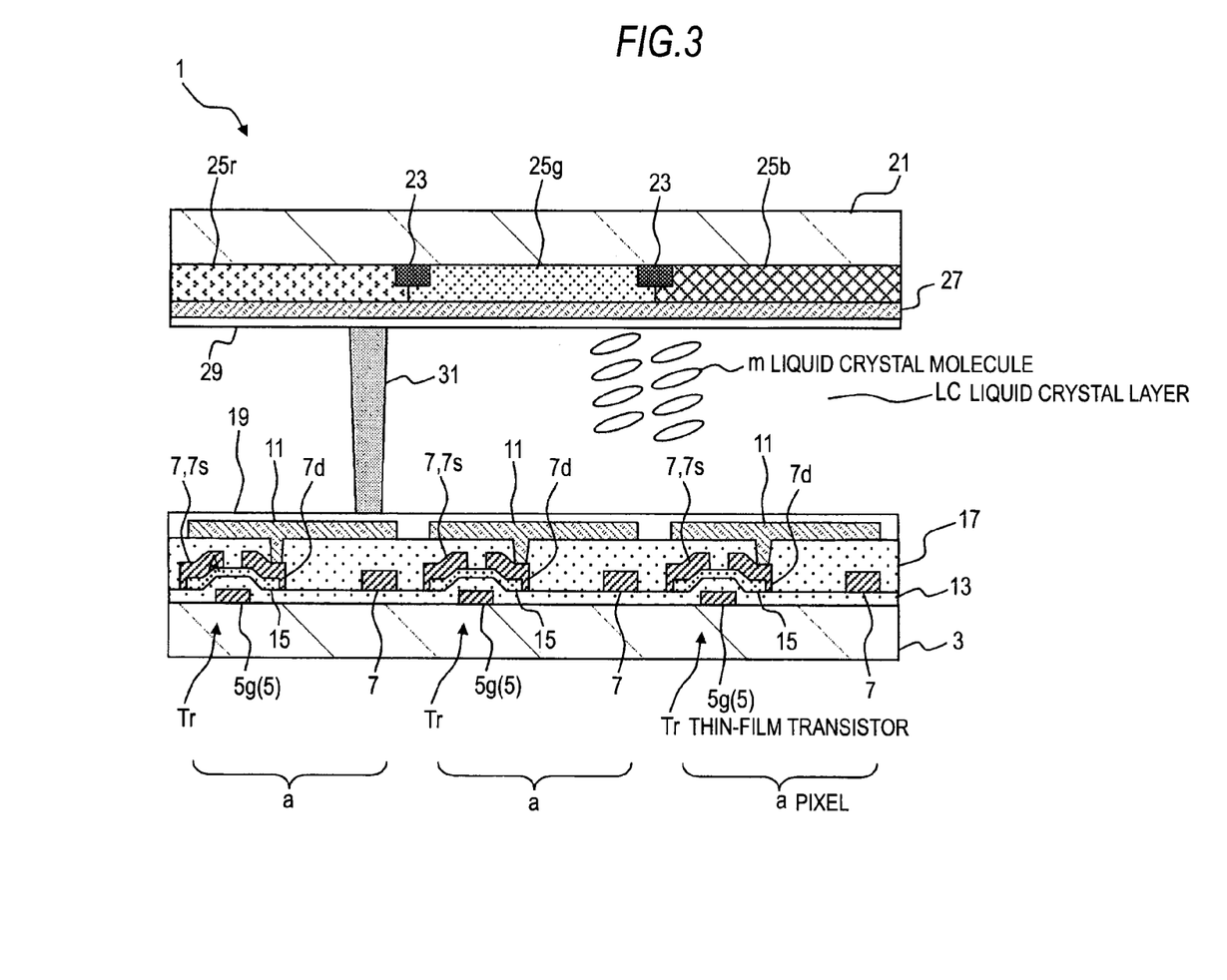
FIG. 3 is a schematic cross-sectional configuration diagram corresponding to the cross section taken along the line A-A' in FIG. 2.

FIG. 2 shows an example of the layout of the liquid crystal display device 1 according to the first embodiment. The layout includes three pixels in the horizontal direction and one pixel formed of two sub-pixels in the vertical direction, three pixels in total. FIG. 3 is a schematic cross-sectional configuration diagram corresponding to the cross section taken along the line A-A' in FIG. 2. The components that are the same as those in FIG. 1 have the same reference characters.

As shown in FIGS. 2 and 3, the scan lines 5 and the common wiring lines 9 made of a material that excels in conductivity, such as aluminum, are successively disposed in the first direction (the horizontal direction in the description) in a first layer on the substrate 3 formed of, for example, a glass substrate. A group of two common wiring lines 9 disposed on opposite sides of one scan line 5 is repeatedly disposed.

Each of the scan lines 5 extends in the horizontal direction and is patterned to form the gate electrode 5g of the thin-film transistor Tr in each of the pixels (a). Each of the common wiring lines 9 extends in the horizontal direction and functions as the lower electrode of the auxiliary capacitive element (Cs) shown in FIG. 1 in each of the pixels (a).

The scan lines 5, each of which includes the gate electrode 5g, and the common wiring lines 9 described above are covered with a gate insulating film 13, which is shown only in the cross-sectional view.

Semiconductor layers 15, each of which is an active area of the corresponding thin-film transistor Tr, are provided in a second layer on the gate insulating film 13 in the positions where the gate electrodes 5g are formed.

On the gate insulating film 13 on which the semiconductor layers 15 are provided, the signal lines 7 and the source electrodes 7s and the drain electrodes 7d of the thin-film transistors Tr are provided. Each of the source electrodes 7s is formed by extending the corresponding signal line 7 and placed on the corresponding semiconductor layer 15 in each of the pixels. The signal lines 7, the source electrodes 7s, and the drain electrodes 7d are made of a material that excels in conductivity, such as aluminum.

An insulating film 17, such as an overcoat layer (having a film thickness of 2 μm) and a planarization insulating film, shown only in the cross-sectional view is provided to cover the semiconductor layers 15, the signal lines 7, the source electrodes 7s, and the drain electrodes 7d described above.

The pixel electrodes 11 made of ITO or any other suitable transparent conductive material are formed and arranged in a third layer on the insulating film 17. Each of the pixel electrodes 11 is connected to the corresponding drain electrode 7d via a connection hole provided in the interlayer insulating film 17. The portion sandwiched between the common wiring line 9 as the lower electrode and the pixel electrode 11 located thereabove is formed as the capacitive element (Cs) shown in FIG. 1.

The first embodiment, in particular, is characterized in that each of the pixel electrodes 11 is formed of a frame-shaped connection electrode 11a and a plurality of electrode bodies 11b supported by the connection electrode 11a.

The frame-shaped connection electrode 11a is formed along the contour of the pixel electrode 11 and overlays via the insulating film (see FIG. 3) the wiring lines connected to the thin-film transistor Tr for driving the pixel electrode 11, such as the corresponding scan line 5, two signal lines 7, and common wiring line 9. The process of disposing the connection electrode 11a in such a way that it overlays the wiring lines 5, 7, and 9 is preferably carried out in such a way that the wiring lines 5, 7, and 9 are not disposed inside the connection electrode 11a. The connection electrode 11a may also be disposed in such a way that it overlays the source electrode 7s and the drain electrode 7d made of the same material as that of the signal lines 7. The connection electrode 11a preferably has a completely closed frame shape or may alternatively have a frame shape with a slit present in part thereof.

The electrode bodies 11b are arranged in the frame of the connection electrode 11a and connected to and supported by the connection electrode 11a. The electrode bodies 11b are configured as what is called a comb-tooth electrode as a whole and arranged at predetermined spacings and parallel to one another, whereby liquid crystal molecules m, which will be described later, are oriented substantially along the electrode bodies 11b.

The electrode bodies 11b are disposed in four areas obtained by dividing the pixel electrode 11 along boundaries, the center line parallel to the horizontal direction and the center line parallel to the vertical direction, and extend in four different directions inclined to the center lines by 45 degrees. In this case, each of the electrode bodies 11b extends in each of the areas from the inner edge of the connection electrode 11a toward the center of the pixel electrode 11. As a result, the pixel electrode 11 has four areas a1, a2, a3, and a4 in which the respective electrode bodies 11b extend in different directions. The four areas form a multi-domain configuration in which the liquid crystal molecules m, which will be described later, are oriented in four different directions.

In the four areas obtained by dividing the pixel electrode 11, the width of the line-and-space (the electrode body 11 is defined as the line) ranges from approximately 4 to 10 μm when the line:the space≈1:1. For example, the width of the line-and-space is 8 μm.

The electrode bodies 11b in the four areas obtained by dividing the pixel electrode 11 are separated from each other by slits S provided along the center lines of the pixel electrode 11, which are the boundaries between the areas. As a result, the slits S work as oriented nuclei when the liquid crystal molecules m, which will be described later, are oriented, whereby the orientation is stably divided.

The thus configured pixel electrode 11 is covered with an orientation film 19. The orientation film 19 is a vertical orientation film that preferably imparts a pretilt angle for fast response. Specifically, a pretilt angle is imparted by using a PSA-based (Polymer-Sustained Alignment) method, optical orientation, mask rubbing, and any other suitable method. In the present embodiment, the orientation film 19 is preferably a vertical orientation film having a pretilt angle of 89.5 degrees or smaller and having, for example, a film thickness of approximately 0.1 μm. Further, the azimuthal direction of the pretilt angle is inclined to the signal lines 7, for example, by 45 degrees.

Further, a counter electrode 21 shown only in the cross-sectional view is provided over the thus configured driving substrate 3 on the side where the pixel electrodes 11 are formed. A black matrix 23 and color filters 25r, 25g, and 25b are provided on the surface of the counter substrate 21 that faces the pixel electrodes 11, and a common electrode 27 common to all the pixels is provided over the counter substrate 21.

The black matrix 23 is disposed in such a way that it faces and covers the gaps between the pixels (a)-(a) arranged in the horizontal and vertical directions. Openings provided in the black matrix 23 substantially work as pixel openings. It is preferred that the black matrix 23 completely covers the scan lines 5, the signal lines 7, and the common wiring lines 9. The color filters 25r, 25g, and 25b are formed and arranged in correspondence with the pixels (a) separated by the black matrix 23.

The common electrode 27 described above is covered with an orientation film 29. The orientation film 29 is also a vertical orientation film that preferably imparts a pretilt angle, which is similar to the orientation film 19 on the side where the substrate 3 is present. The azimuthal direction of the pretilt angle of the orientation film 29 is antiparallel to that of the orientation film 19 on the side where the substrate 3 is present.

As shown only in the cross-sectional view, a liquid crystal layer LC is disposed between the orientation film 19 on the substrate 3 and the orientation film 29 on the counter substrate 21. The liquid crystal layer LC contains the liquid crystal molecules m driven by turning the pixel electrodes 11 on and off. The liquid crystal molecules m are negative liquid crystal material having negative dielectric anisotropy ($\Delta n=0.8$, $\Delta \in =-3$, for example).

The distance between the substrate 3 and the counter substrate 21, between which the liquid crystal layer LC is sandwiched, is maintained at a predetermined value (cell gap), for example, by column-shaped spacers 31 interposed between the substrate 3 and the counter substrate 21. In the present embodiment, the cell gap is adjusted in such a way that a phase difference of approximately $\lambda/2$ ($\lambda/4$ when the liquid crystal display device is a reflective one) is produced in the liquid crystal layer LC with the major axis of the liquid crystal molecules m oriented in parallel to the direction in which the electrode bodies 11b extend. In this case, the cell gap is adjusted by providing the column-shaped spacers 31, for example, made of a resist material and having a height of 4 μm.

A pair of polarizers (not shown) in the crossed-nicol state is disposed outside the substrates 3 and 21 described above, and a backlight (not shown) is disposed outside the polarizer on the side where the substrate 3 is present. The liquid crystal display device 1 is thus configured.

In the thus configured liquid crystal display device 1 described above, the pixel electrodes 11 and the common electrode 27 face each other with the liquid crystal layer LC sandwiched therebetween, and a vertical electric field produced between the pixel electrodes 11 and the common electrode 27 drives the liquid crystal layer LC. Each of the pixel electrodes 11 is driven by the corresponding pixel circuit having the thin-film transistor Tr, and the corresponding scan line 5, two signal lines 7, and common wiring line disposed below the pixel electrode 11 via the insulating film 17 on the side where the substrate 3 is present.

The liquid crystal display device 1 of the embodiment described above is a liquid crystal display device driven in the VA-mode in which the liquid crystal molecules m follow the pretilt angle of the orientation films 19 and 29 when no voltage is applied to the pixel electrodes 11 and are oriented substantially perpendicular to the surface of the substrate 3. When no electric field is applied, the light from the backlight disposed outside the substrate 3 is absorbed by the polarizer on the side where the counter substrate 21 is present, resulting in black display.

On the other hand, since each of the pixel electrodes 11 is formed of a plurality of electrode bodies 11b disposed in parallel to each other, the liquid crystal molecules m having negative dielectric anisotropy are inclined in the four directions, which are the directions in which the electrode bodies 11b extend, when a voltage is applied to the pixel electrode 11. As a result, the liquid crystal molecules m are oriented in such a way that the major axis thereof is parallel to the directions in which the electrode bodies 11b extend, and a phase difference of approximately $\lambda/2$ is produced in the liquid crystal layer LC, resulting in white display. In this process, since the liquid crystal molecules m have a multi-domain configuration in which the molecules are oriented in the four different directions, the viewing angle characteristics are improved.

In the liquid crystal display device 1 of the first embodiment, in particular, the frame-shaped connection electrode 11a forms the outer shape of each of the pixel electrodes 11, and the connection electrode 11a overlays the corresponding scan line 5, two signal lines 7, and common wiring line 9. In this configuration, the connection electrode 11a shields the wiring lines 5, 7, and 9 described above, whereby the electric field resulting from the voltages applied to the wiring lines 5, 7, and 9 will not leak through the slits between the electrode bodies 11b to the gap between the pixel electrodes 11 and the common electrode 27. As a result, the vertical electric field between the pixel electrodes 11 and the common electrode 27 is well maintained, resulting in high-contrast display characteristics without liquid crystal molecule orientation disturbance due to electric field leakage and corresponding light leakage.

The thus configured liquid crystal display device 1 may be configured to carry out a display drive operation by using unit pixels each of which is formed of two pixels (a) (sub-pixels) that share one scan line 5. In this case, two adjacent pixels (a) (sub-pixels) disposed, for example, in the direction in which the corresponding two signal lines 7 extend form one unit pixel.

In two sub-pixels (a) that form one unit pixel, the corresponding pixel electrodes 11 may have different sizes from each other. Further, the two sub-pixels may have a multi-pixel structure in which they are driven by different voltages (threshold values), and the grayscales of the sub-pixels may be adjusted separately. This allows uniform-brightness display in the front and oblique directions within the viewing angle and solves a "wash-out phenomenon," in which the brightness increases in the oblique directions within the viewing angle.

Figure 4A:
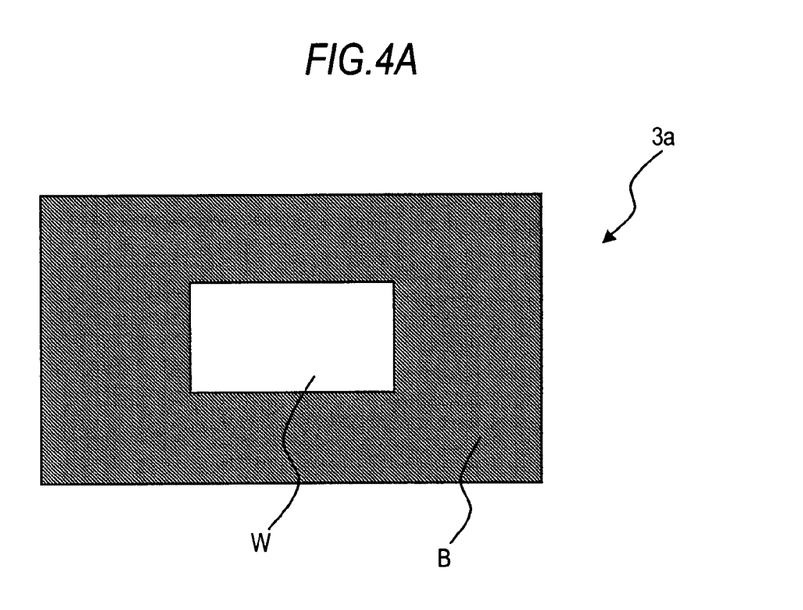
FIGS. 4A and 4B show images obtained by displaying in a display area an image formed of a central white rectangle against a fully black screen.

FIG. 4A shows a result obtained by driving the thus configured liquid crystal display device 1 to display an image in the display area 3a, the image formed of a central white rectangle W against a fully black screen B. In each of the pixel electrodes 11, the line (electrode body 11b):the space=4 μm:4 μm. The pretilt angle of each of the orientation films 19 and 29 is 89.5 degrees, and the liquid crystal layer LC contains negative liquid crystal molecules m ($\Delta n=0.8$, $\Delta \epsilon=-3$). The pixel electrodes 11 for two sub-pixels that form one unit pixel have the same shape and are driven by the same drive voltage. The number of pixels in the display area 3a is 1920×1080, which forms a full high-vision screen.

As shown in FIG. 4A, the display area 3a displays the white rectangle W only at the center of the fully black screen B, and the portion around the white rectangle W is kept in black without any light leakage. It is thus ascertained that no crosstalk occurs and no electric field leakage occurs from the gap between the electrode bodies 11b and 11b of each of the pixel electrodes 11 to the gap between the pixel electrodes 11 and the common electrode 27.

Figure 4B:
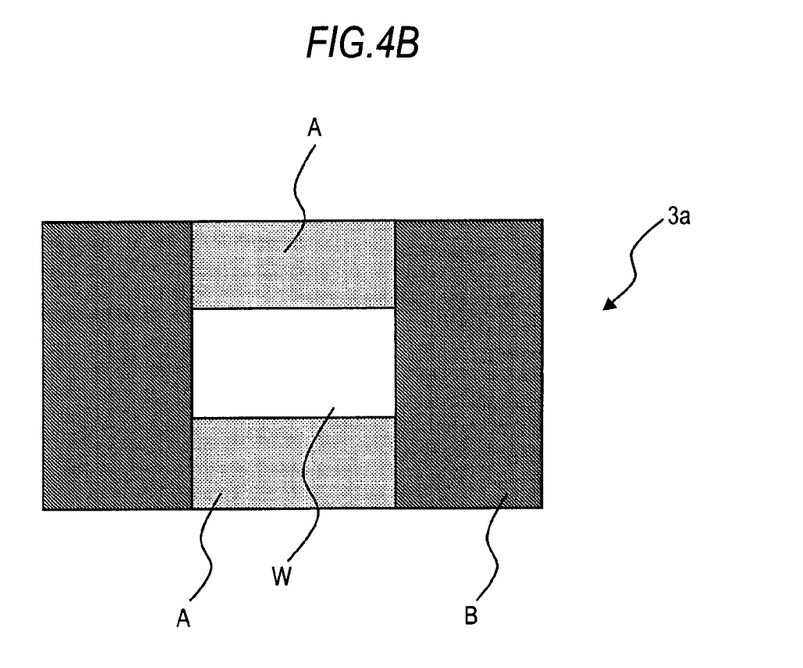

As a comparison, FIG. 4B shows an image obtained by displaying the same image in a liquid crystal display device of related art using pixel electrodes each of which has a configuration in which no frame-shaped connection electrode is used but a plurality of electrode bodies are connected to each other at the center of the pixel electrode. As shown in FIG. 4B, there appear gray areas A above and below the white rectangle W in which the grayscale level decreases due to crosstalk. It is therefore shown that electric field leakage to the gap between the pixel electrodes 11 and the common electrode 27 causes light leakage.

The crosstalk described above primarily results from the voltage applied to the signal lines 7. It is therefore possible to prevent crosstalk by disposing the connection electrode 11a of each of the pixel electrodes 11 in such a way that it overlays the corresponding two signal lines 7, as described in the first embodiment.

2. Second Embodiment

Figure 5:
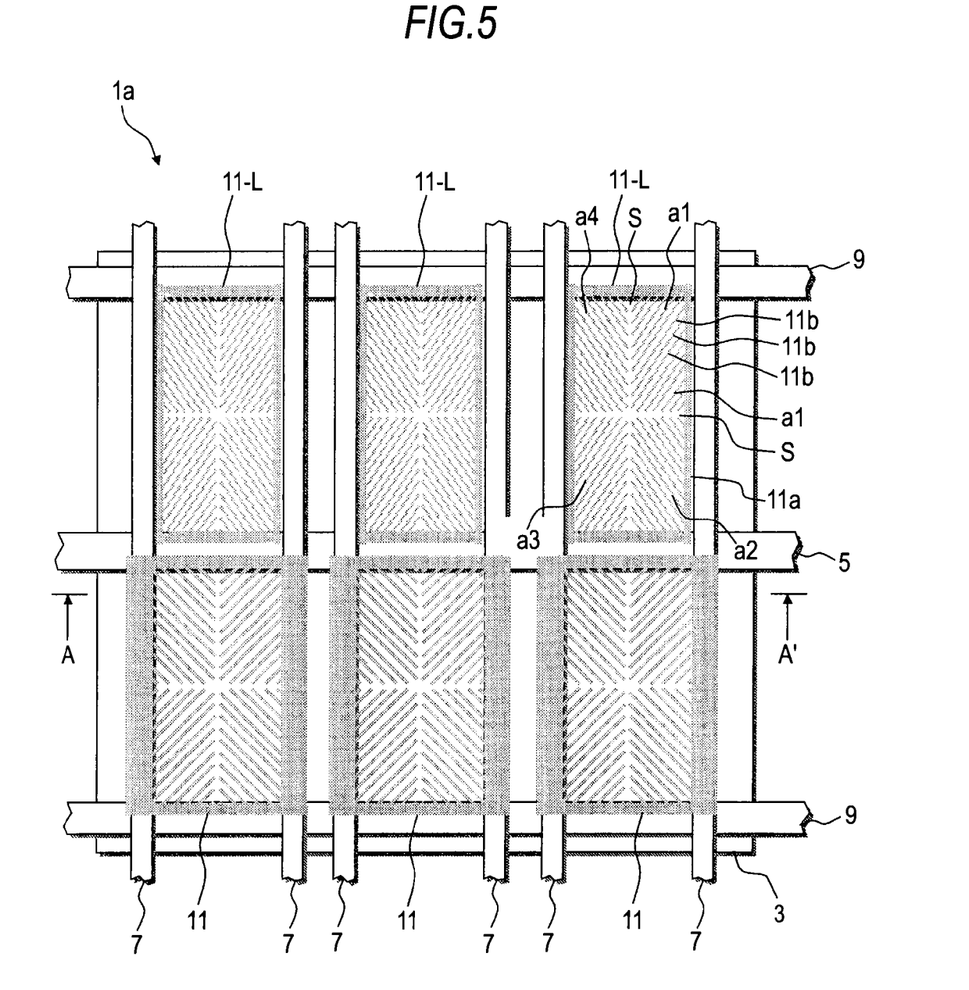
FIG. 5 shows an example of the layout of a liquid crystal display device 1a of a second embodiment.

FIG. 5 shows an example of the layout of characteristic portions of a liquid crystal display device 1a according to a second embodiment. The layout includes three pixels in the horizontal direction and one pixel formed of two sub-pixels in the vertical direction, three pixels in total. The liquid crystal display device 1a of the second embodiment shown in FIG. 5 is similar to the display device of the first embodiment but differs therefrom in that the connection electrode 11a of each of part of the pixel electrodes 11 does not overlay the corresponding wiring lines 5, 7, and 9.

That is, the liquid crystal display device 1a carries out a display drive operation by using unit pixels each of which is formed of two pixels (a) (sub-pixels) that share one scan line 5 and has a multi-pixel structure in which the two sub-pixels (a) are driven by different voltages (threshold values). The pixel electrode 11 provided in each of the sub-pixels (a) is the same as the pixel electrode 11 in the first embodiment and has a shape formed by the connection electrode 11a and the electrode bodies 11b.

In particular, the connection electrode 11a in a pixel electrode 11-L of one of the two pixels (a) that form a unit pixel, the one sub-pixel a driven by a lower threshold voltage, does not completely overlay at least part of the wiring lines (the corresponding two signal lines 7, for example) but is shifted therefrom. For example, two portions of the connection electrode 11a extending in the direction in which the signal lines 7 extend are disposed inside the corresponding signal lines 7 disposed on both side of the pixel electrode 11-L.

In the thus configured liquid crystal display device 1a, since the connection electrode 11a of each of the pixel electrodes 11 overlays the corresponding wiring lines 5, 7, and 9, parasitic capacitance tends to be added between the pixel electrode 11 and the wiring lines 5, 7, and 9. In the sub-pixel a driven by a lower threshold voltage, in particular, the parasitic capacitance between the corresponding two signal lines 7 and the pixel electrode 11-L adversely affects the drive operation of the pixel electrode 11-L. In the second embodiment, however, since the portion of the connection electrode 11a of the pixel electrode 11-L that overlays the corresponding two signal lines 7 is small, the parasitic capacitance can be reduced. As a result, even when a multi-pixel structure is employed, the sub-pixel a driven by a lower threshold voltage can be stably driven.

<Variations>

FIGS. 6A to 6E are plan views showing variations of each of the pixel electrodes used in the invention.

Figure 6A:
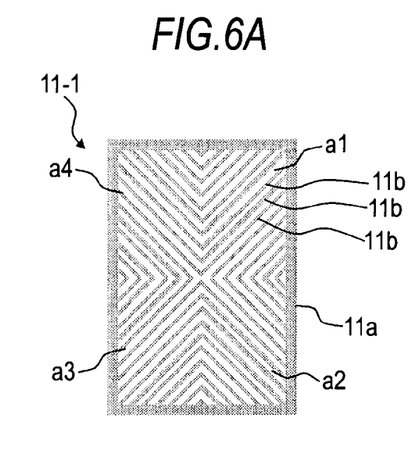
FIGS. 6A to 6E are plan views showing variations of a pixel electrode used in the invention.

A pixel electrode 11-1 shown in FIG. 6A differs from the pixel electrode 11 in the first embodiment in that the electrode bodies 11b disposed in the four areas a1 to a4 are connected to each other at the boundaries thereof. The configuration described above also allows high-contrast display characteristics to be provided because the connection electrode 11a shields the corresponding wiring lines 5, 7, and 9, as in the first embodiment.

Figure 6B:
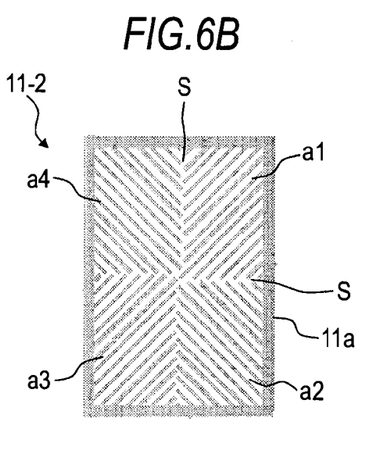

A pixel electrode 11-2 shown in FIG. 6B differs from the pixel electrode 11 in the first embodiment in that the tips of the electrode bodies 11b disposed in the four areas a1 to a4 are alternately disposed along the boundaries thereof. The configuration described above also allows high-contrast display characteristics to be provided because the connection electrode 11a shields the corresponding wiring lines 5, 7, and 9, as in the first embodiment. Further, in the configuration described above, when the electrode bodies 11b are grouped and disposed in the areas a1 to a4 obtained by dividing the pixel electrode 11 and the slits S are provided, the width of the slits S can be sufficiently reduced. It is therefore possible to not only use the slits S as oriented nuclei for the liquid crystal molecules to stably divide the orientation but also arrange the electrode bodies 11b without any unnecessary gap in the frame of the connection electrode 11a to effectively produce a vertical electric field between the pixel electrodes 11 and the common electrode, whereby the white transmittance can be improved.

Figure 6C:
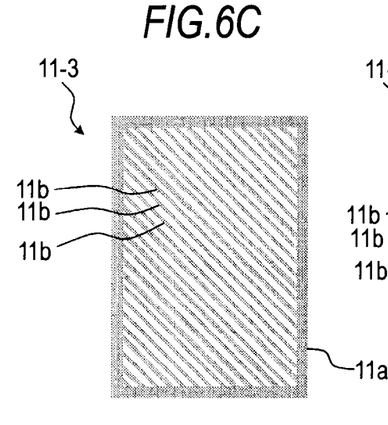

A pixel electrode 11-3 shown in FIG. 6C is formed only of the electrode bodies 11b extending in a single direction, and both ends of each of the electrode bodies 11b are connected to the connection electrode 11a. The electrode bodies 11b extend in the direction inclined to, for example, the scan lines or the signal lines by 45 degrees. A liquid crystal display device provided with the thus configured pixel electrodes 11-3 has a mono-domain configuration in which the liquid crystal molecules m are oriented only in a single direction along the direction in which the electrode bodies 11b extend. The configuration described above also allows high-contrast display characteristics to be provided because the connection electrode 11a shields the corresponding wiring lines 5, 7, and 9, as in the first embodiment. The direction in which the electrode bodies 11b extend may alternatively be the direction along the scan lines or the signal lines.

Figure 6D:
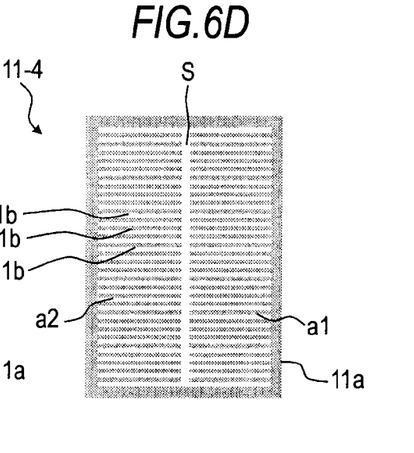

A pixel electrode 11-4 shown in FIG. 6D is formed only of the electrode bodies 11b extending in a single direction, and only one end of each of the electrode bodies 11b is connected to the connection electrode 11a. A slit S provided in a central portion divides the pixel electrode 11-4 into two areas a1 and a2. The electrode bodies 11b extend in parallel to, for example, the scan lines. A liquid crystal display device provided with the thus configured pixel electrodes 11-4 has a multi-domain configuration in which the slit S works as an oriented nucleus and the liquid crystal molecules m are oriented in the single direction along the direction in which the electrode bodies 11b extend. The configuration described above also allows high-contrast display characteristics to be provided because the connection electrode 11a shields the corresponding wiring lines 5, 7, and 9, as in the first embodiment. The direction in which the electrode bodies 11b extend may be the direction along the signal lines or the direction inclined to the scan lines or the signal lines by 45 degrees.

Figure 6E:
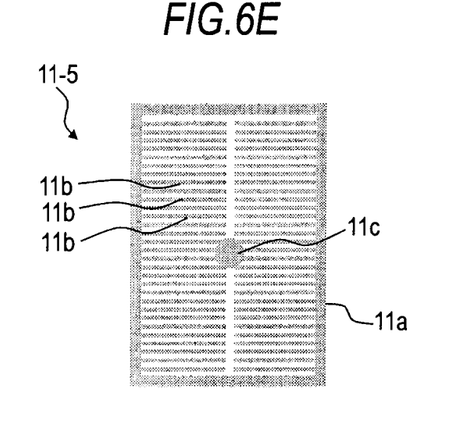

A pixel electrode 11-5 shown in FIG. 6E has a configuration in which a pad 11c for connecting the pixel electrode 11-5 to the drain electrode of the corresponding thin-film transistor is provided at the center of the pixel electrode 11-4 shown in FIG. 6D. The pad 11c is supported by the connection electrode 11a via a plurality of electrode bodies 11b. The configuration described above also allows high-contrast display characteristics to be provided because the connection electrode 11a shields the corresponding wiring lines 5, 7, and 9, as in the first embodiment. Further, the pad 11c may also be used as an oriented nucleus for the liquid crystal molecules to stably divide the orientation. In this case, the pad 11c is preferably disposed at the center of the pixel electrode 11. The position in which the pad 11c is provided is not limited to the center of the pixel electrode 11-5, but may be anywhere in the pixel electrode 11-5. For example, the pad 11c may be provided in a position where it is directly supported by the connection electrode 11a. The pad 11c may be provided in the same manner in any of the pixel electrodes described in the above embodiments and variations.

<Applications>

Any of the liquid crystal display devices according to the embodiments of the invention described above can be used as a display panel in a display section of a variety of electronic apparatus shown in FIGS. 7 to 11G. For example, any of the liquid crystal display devices can be used in a display section of an electronic apparatus in any field in which a video signal inputted to the electronic apparatus or a video signal produced in the electronic apparatus is displayed as an image, such as digital cameras, notebook personal computers, mobile phones or other portable terminals, and video camcorders. Exemplary electronic apparatus to which the invention is applied will be described below.

Figure 7:
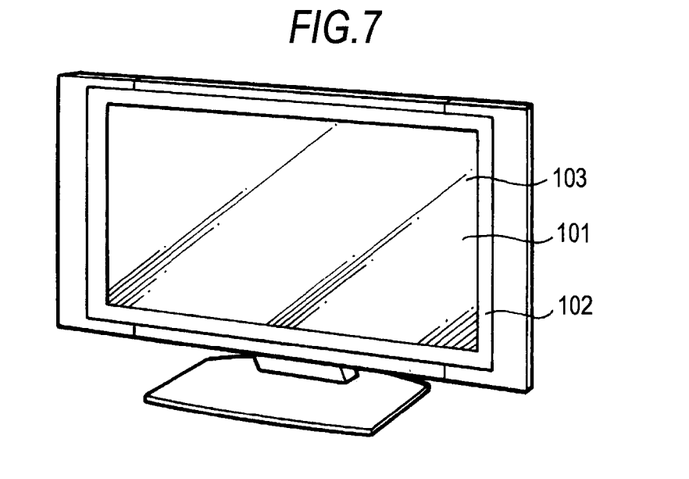
FIG. 7 is a perspective view showing a television to which the invention is applied.

FIG. 7 is a perspective view showing a television to which the invention is applied. The television according to the present application includes a video display screen 101 formed of a front panel 102, a filter glass plate 103, and other components, and the video display screen 101 is produced by using any of the display devices according to the embodiments of the invention.

Figure 8A:
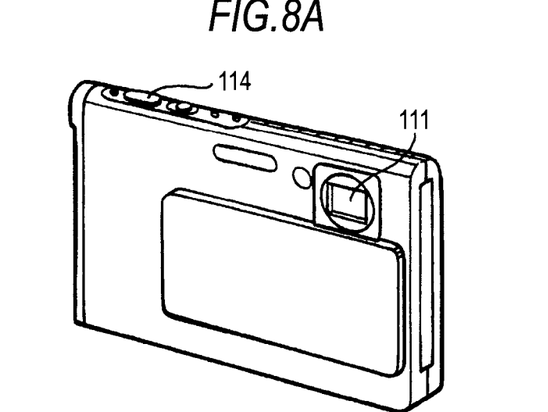
FIGS. 8A and 8B show a digital camera to which the invention is applied, FIG. 8A being a front perspective view, and FIG. 8B being a rear perspective view.
Figure 8B:
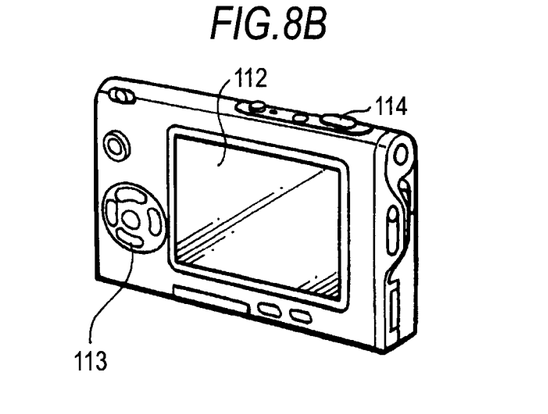

FIGS. 8A and 8B show a digital camera to which the invention is applied. FIG. 8A is a front perspective view, and FIG. 8B is a rear perspective view. The digital camera according to the present application includes a flash light emitter 111, a display section 112, a menu switch 113, and a shutter button 114, and the display section 112 is produced by using any of the display devices according to the embodiments of the invention.

Figure 9:
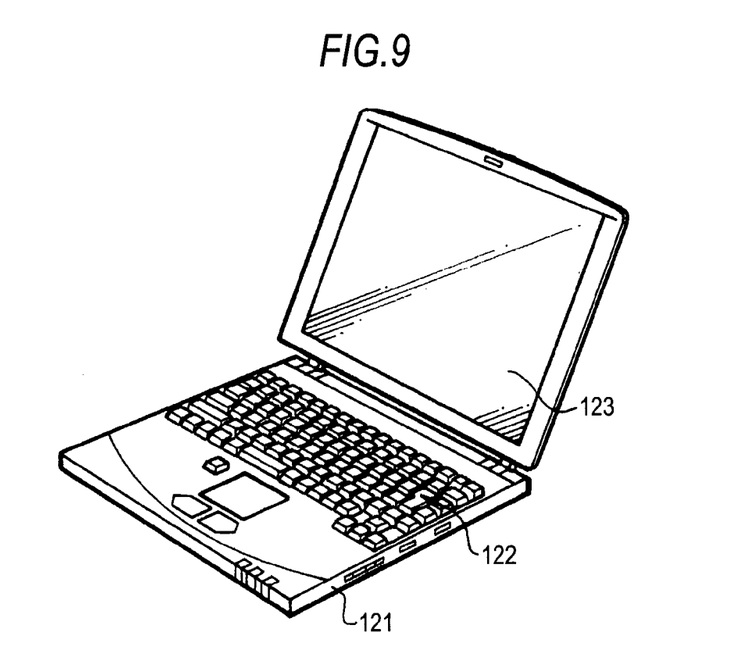
FIG. 9 is a perspective view showing a notebook personal computer to which the invention is applied.

FIG. 9 is a perspective view showing a notebook personal computer to which the invention is applied. The notebook personal computer according to the present application includes a body 121, a keyboard 122 operated when characters and other information are inputted, a display section 123 on which an image is displayed, and the display section 123 is produced by using any of the display devices according to the embodiments of the invention.

Figure 10:
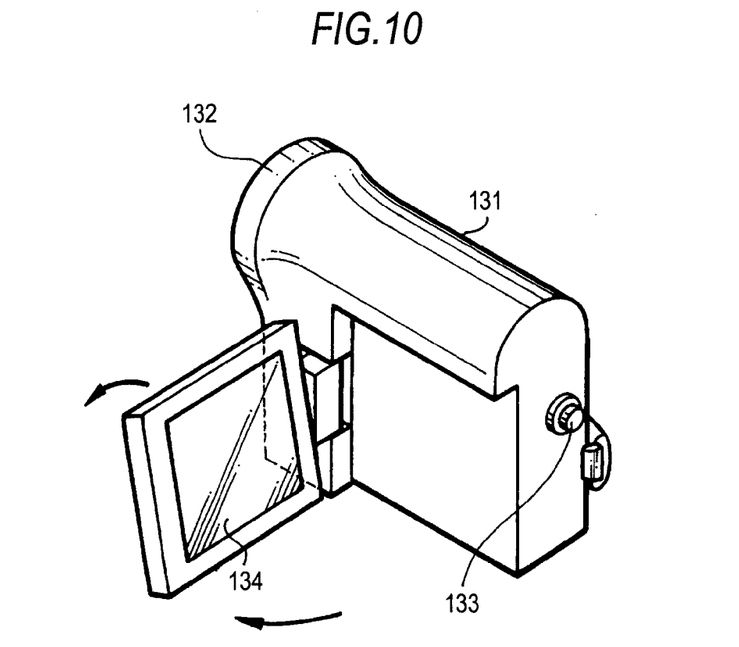
FIG. 10 is a perspective view showing a video camcorder to which the invention is applied.

FIG. 10 is a perspective view showing a video camcorder to which the invention is applied. The video camcorder according to the present application includes a body 131, a subject imaging lens 132 provided on the side facing frontward, a start/stop switch 133 used when video images are captured, and a display section 134, and the display section 134 is produced by using any of the display devices according to the embodiments of the invention.

Figures 11A, 11B:
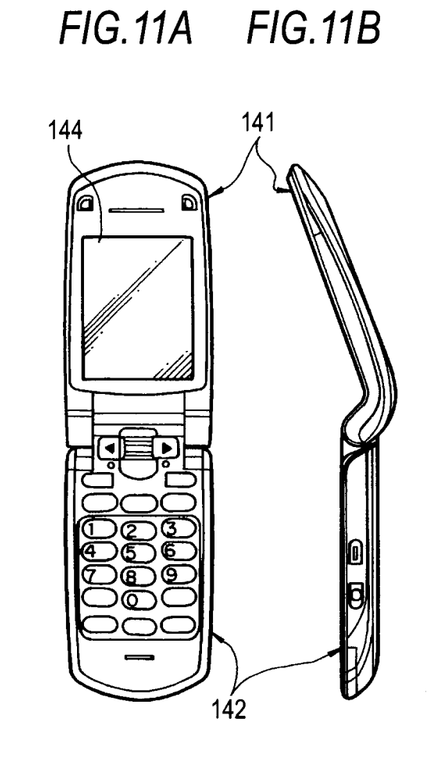
FIGS. 11A to 11G show a portable terminal to which the invention is applied, for example, a mobile phone, FIG. 11A being a front view of the mobile phone in an unfolded state, FIG. 11B being a side view of the unfolded mobile phone, FIG. 11C being a front view of the mobile phone in a folded state, FIG. 11D being a left side view of the folded mobile phone, FIG. 11E being a right side view of the folded mobile phone, FIG. 11F being a top view of the folded mobile phone, and FIG. 11G being a bottom view of the folded mobile phone.
Figures 11C, 11D:
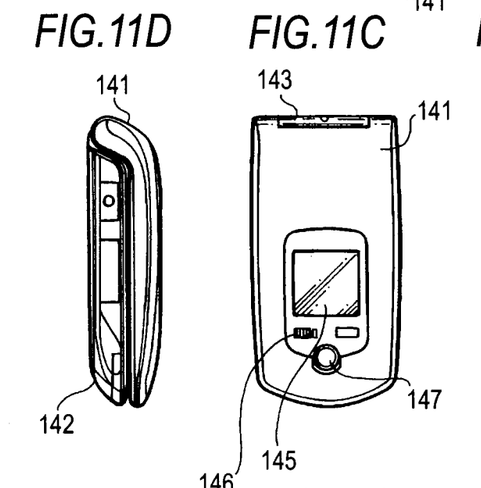
Figure 11E:
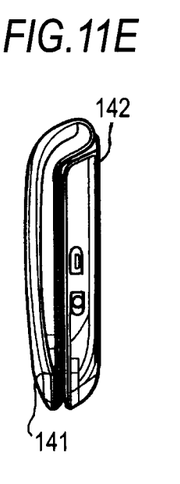
Figure 11F:
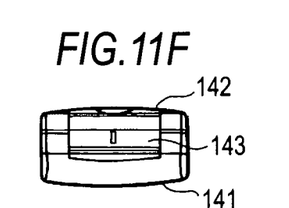
Figure 11G:
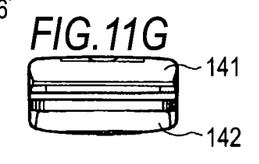

FIGS. 11A to 11G show a portable terminal to which the invention is applied, for example, a mobile phone. FIG. 11A is a front view of the mobile phone in an unfolded state. FIG. 11B is a side view of the unfolded mobile phone. FIG. 11C is a front view of the mobile phone in a folded state. FIG. 11D is a left side view of the folded mobile phone. FIG. 11E is a right side view of the folded mobile phone. FIG. 11F is a top view of the folded mobile phone. FIG. 11G is a bottom view of the folded mobile phone. The mobile phone according to the present application includes an upper housing 141, a lower housing 142, a connection unit (a hinge in the present application) 143, a display 144, a sub-display 145, a picture light 146, and a camera 147, and the display 144 and the sub-display 145 are produced by using any of the display devices according to the embodiments of the invention.

The present application contains subject matter related to that disclosed in Japanese Priority Patent Application JP 2009-009524 filed in the Japan Patent Office on Jan. 20, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A liquid crystal display device comprising:
a plurality of pixel electrodes formed of a frame-shaped connection electrode and electrode bodies arranged in parallel to one another in a frame of the connection electrode and supported by and connected to the connection electrode; and a common electrode insulated from the plurality of pixel electrodes, wherein a plurality of pixels formed of adjacent ones of the plurality of pixel electrodes form one unit pixel, and wherein the plurality of pixels that form a unit pixel are driven at different threshold values, a wiring line connected to a thin-film transistor for driving each of the plurality of pixel electrodes and disposed via an insulating film in such a way that the wiring line and the common electrode sandwich each of the plurality of pixel electrodes, wherein among the plurality of pixels, the connection electrode of a corresponding pixel electrode in a pixel driven at a low threshold value is disposed in a position where the connection electrode is shifted from at least part of the wiring line.

2. The liquid crystal display device according to claim 1, further comprising a wiring line connected to a thin-film transistor for driving each of the plurality of pixel electrodes and disposed via an insulating film in such a way that the wiring line and the common electrode sandwich each of the plurality of pixel electrodes, wherein the connection electrode of the plurality of pixel electrodes overlays the wiring line.

3. The liquid crystal display device according to claim 2, wherein the wiring line is a signal line.

4. The liquid crystal display device according to any of claims 1 to 3, further comprising a liquid crystal layer between a substrate on which the plurality of pixel electrodes are arranged and a counter substrate on which the common electrode is provided.

5. The liquid crystal display device according to any of claims 1 to 3, wherein each of the plurality of pixel electrodes has a plurality of areas in which the electrode bodies extend in respective different directions.

6. The liquid crystal display device according to claim 5, wherein a slit is provided between the plurality of areas.

7. The liquid crystal display device according to any of claims 1 to 3, wherein liquid crystal molecules driven by the plurality of pixel electrodes have negative dielectric anisotropy.

8. The liquid crystal display device according to claim 7, wherein an orientation film that covers the plurality of pixel electrodes has a pretilt angle of 89.5 degrees or smaller.

9. An electronic apparatus comprising:

a display panel including a plurality of pixel electrodes formed of a frame-shaped connection electrode and electrode bodies arranged in parallel to one another in a frame of the connection electrode and supported by and connected to the connection electrode, and a common electrode insulated from the plurality of pixel electrodes, wherein a plurality of pixels formed of adjacent ones of the plurality of pixel electrodes form one unit pixel, and wherein the plurality of pixels that form a unit pixel are driven at different threshold values, a wiring line connected to a thin-film transistor for driving each of the plurality of pixel electrodes and disposed via an insulating film in such a way that the wiring line and the common electrode sandwich each of the plurality of pixel electrodes, wherein among the plurality of pixels, the connection electrode of a corresponding pixel electrode in a pixel driven at a low threshold value is disposed in a position where the connection electrode is shifted from at least part of the wiring line.

* * * * *